United States Patent [19]
Cole et al.

[11] Patent Number: 4,603,382
[45] Date of Patent: Jul. 29, 1986

[54] DYNAMIC BUFFER REALLOCATION

[75] Inventors: David C. Cole; Scott M. Fry; Harry O. Hempy; Phuoc D. Phan, all of Tucson, Ariz.

[73] Assignee: International Business Machines Corporation, Armonk, N.Y.

[21] Appl. No.: 584,053

[22] Filed: Feb. 27, 1984

[51] Int. Cl.$^4$ .......................... G06F 3/00; G06F 12/00
[52] U.S. Cl. ...................................................... 364/200
[58] Field of Search ... 364/200 MS File, 900 MS File, 364/200, 900

[56] References Cited
U.S. PATENT DOCUMENTS
4,499,539 2/1985 Vosacek ............................. 364/200

Primary Examiner—Raulfe B. Zache
Attorney, Agent, or Firm—H. F. Somermeyer

[57] ABSTRACT

A peripheral data storage system employing a data buffer connected to a plurality of data storage devices, such as tape recorders, dynamically reallocates data buffer storage segments among the various data storage devices. A normalized elapsed-time period is established based upon the number of accesses to the data storage devices. When the number of accesses reaches a threshold the need for dynamic reallocation is examined. During the elapsed-time period the system monitors which of the allocated buffer segments have any data transfer activity at all and also measures the intensity of the activity for the respective buffer segments. In a peripheral system, the intensity is indicated by the number of channel command retries submitted to a connected host processor for the respective allocated buffer segment. Based upon the allocation status of the buffer segments and intensity of activities of the respective buffer segments, the buffer allocations are selectively reallocated among the data storage devices.

27 Claims, 7 Drawing Figures

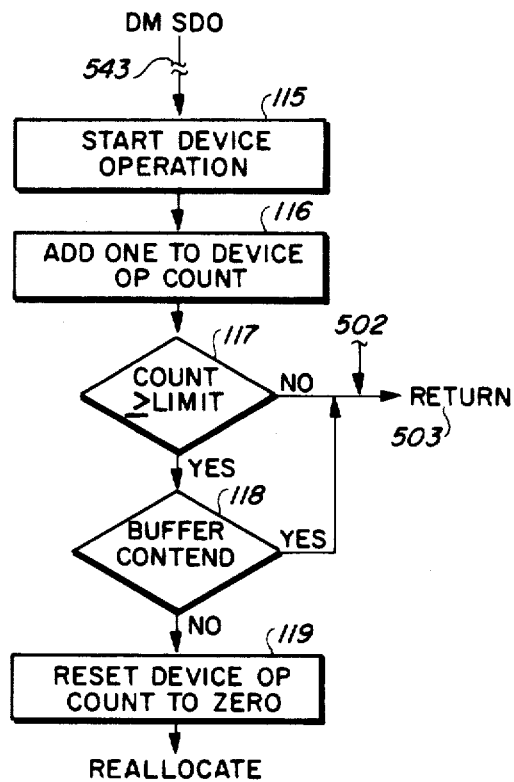
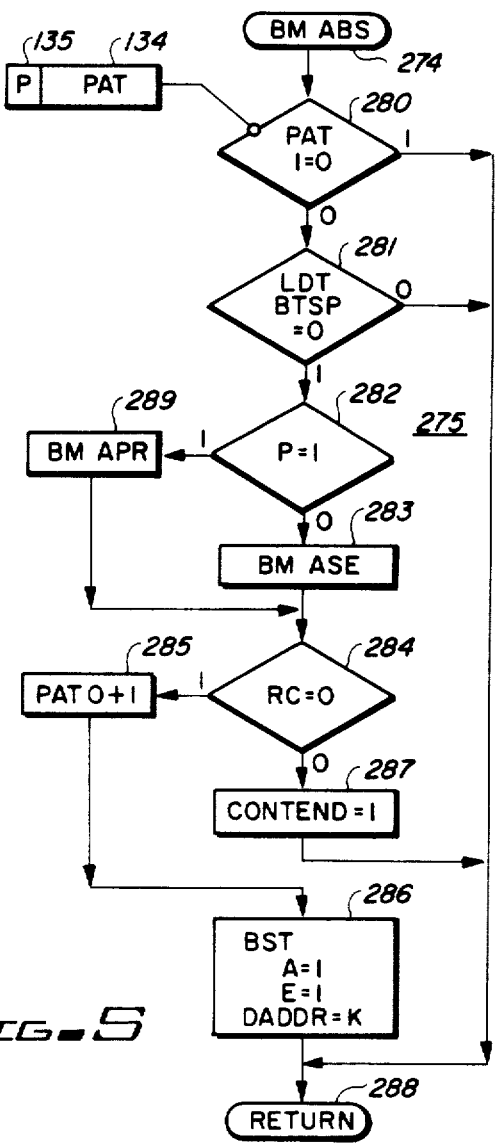
Fig-2
Fig-5
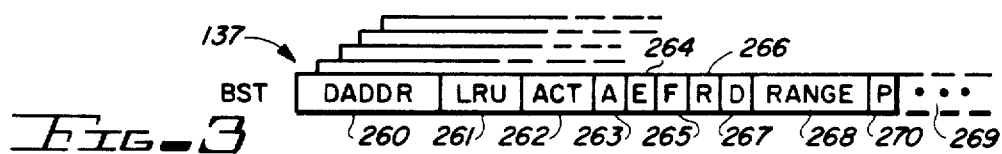
Fig-3
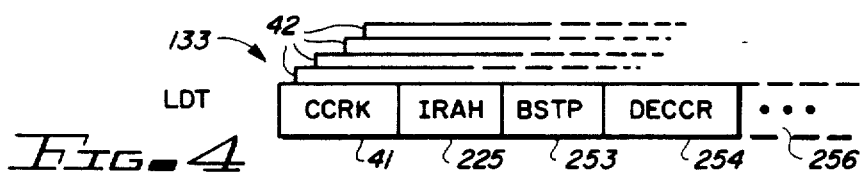
Fig-4

DYNAMIC BUFFER REALLOCATION

DOCUMENTS INCORPORATED BY REFERENCE

U.S. Pat. Nos. 4,423,480 and 4,403,286 are incorporated to complete the disclosure for showing a detailed description of the environment in which the invention is preferably practiced.

U.S. Pat. No. 4,428,064 is incorporated by reference for showing controls of a magnetic tape data storage subsystem for so-called "flushing" data from a data buffer coupled to a magnetic tape recorder.

FIELD OF THE INVENTION

The invention relates to control of a peripheral data storage subsystem, particularly to allocation and reallocation of allocatable segments of a random-access data buffer in such a storage subsystem.

BACKGROUND OF THE INVENTION

Data buffers having allocatable data storage segments have been employed for enhancing the data transfer characteristics of a peripheral data storage system, including those employing magnetic tape recorders. The documents incorporated by reference illustrate such a system. U.S. Pat. No. 4,403,286 indicates that total peripheral system performance can be enhanced by adjusting the peripheral system operation for balancing the workloads between various data buffers in the peripheral system. The performance, i.e., short access time, of the peripheral data storage system can be further enhanced by managing the operation of the data buffer in diverse ways.

For example, the Casey, et al article "Replacement Algorithms for Storage Management in Relational Data Bases" IEEE COMPUTER JOURNAL, Nov. 1976, pp. 306–314 teaches that relations in a data base are variably sized. Each defined relation can have a plurality of allocatable memory units or segments. Each relation has but one entry in a replacement control, which includes a least-recently used (LRU) linked list. This reference shows grouping allocatable segments as a single unit on an LRU linked list.

The U.S. Pat. No. 4,099,235, Hoschler, shows a telephone switching system having a plurality of control computers, which balance their loading based upon a "current measured utilization ratio". This ratio is a quotient of call waiting time divided by computer free or available time. Upon reaching predetermined thresholds, incoming calls are assigned to various control computers (task reassignment, or reallocation). This patent therefore teaches that workloading is a factor in determining reconfiguration, or task reassignment. U.S. Pat. No. 4,008,460 is an example of timestamping an LRU linked list for enabling early cast out, or deallocation of allocated data storage segments of a memory. U.S. Pat. No. 3,898,624 shows varying the bandwidth of a data cache by varying the prefetching time so that more or less allocation in the cache depends on operator-inputted controls.

U.S. Pat. No. 4,403,286 shows the use of counting channel command retries (CCRs) for the purpose of load balancing.

SUMMARY OF THE INVENTION

The present invention dynamically reallocates allocatable memory segments between a plurality of users on a normalized elapsed-time periodic basis. Reallocation, in one aspect of the invention, depends upon the activity of data transfers by a user and in another aspect, reallocation depends upon record size. In the context of the description, a user is a magnetic tape recorder and the data storage unit is the data buffer for all of the magnetic tape recorders.

In another aspect of the invention, the normalized elapsed time is indicated by the total number of accesses to all of the magnetic tape recorders, or users, in a peripheral system. In other words, elapsed time is normalized to total system activity. This time normalization enables dynamic reallocation in a more frequent basis in a busy tape system, which normally means higher performance; while in a slower tape system, the dynamic reallocation employs greater actual elapsed time. Normalized elapsed time is measured in two ways. First is an intensity measurement indicated by the number of channel command retries (CCRs), or processing delays incurred because of data storage unit (buffer) status. For example, when an allocated data storage segment is to receive data for storage, and it is full, then a channel command retry is sent to the requesting host; on the other hand, in a read operation, where data is transferred from the data buffer to a connected host processor, a time delay occurs when the allocated segment is empty. The more time delays, the greater the intensity of data transfer activity. The second indicator relates to whether any access at all has been made to the data buffer by a connected host processor during the normalized elapsed time period. This indicates whether there is any activity at all irrespective of intensity.

The foregoing and other objects, features, and advantages of the invention will be apparent from the following more particular description of preferred embodiments of the invention, as illustrated in the accompanying drawings.

DESCRIPTION OF THE DRAWINGS

FIG. 2 is a simplified flowchart illustrating operations of the FIG. 1 illustrated system in determining whether the activity status of the peripheral system should be checked for possible data segment reallocation.

FIGS. 3 and 4 respectively show data structures used in practicing the present invention in a microprocessor controlled FIG. 1 illustrated system.

FIG. 5 is a flowchart showing allocation procedures for establishing a control input to the dynamic allocation operations of the FIG. 1 illustrated system.

DETAILED DESCRIPTION

Figure 1:
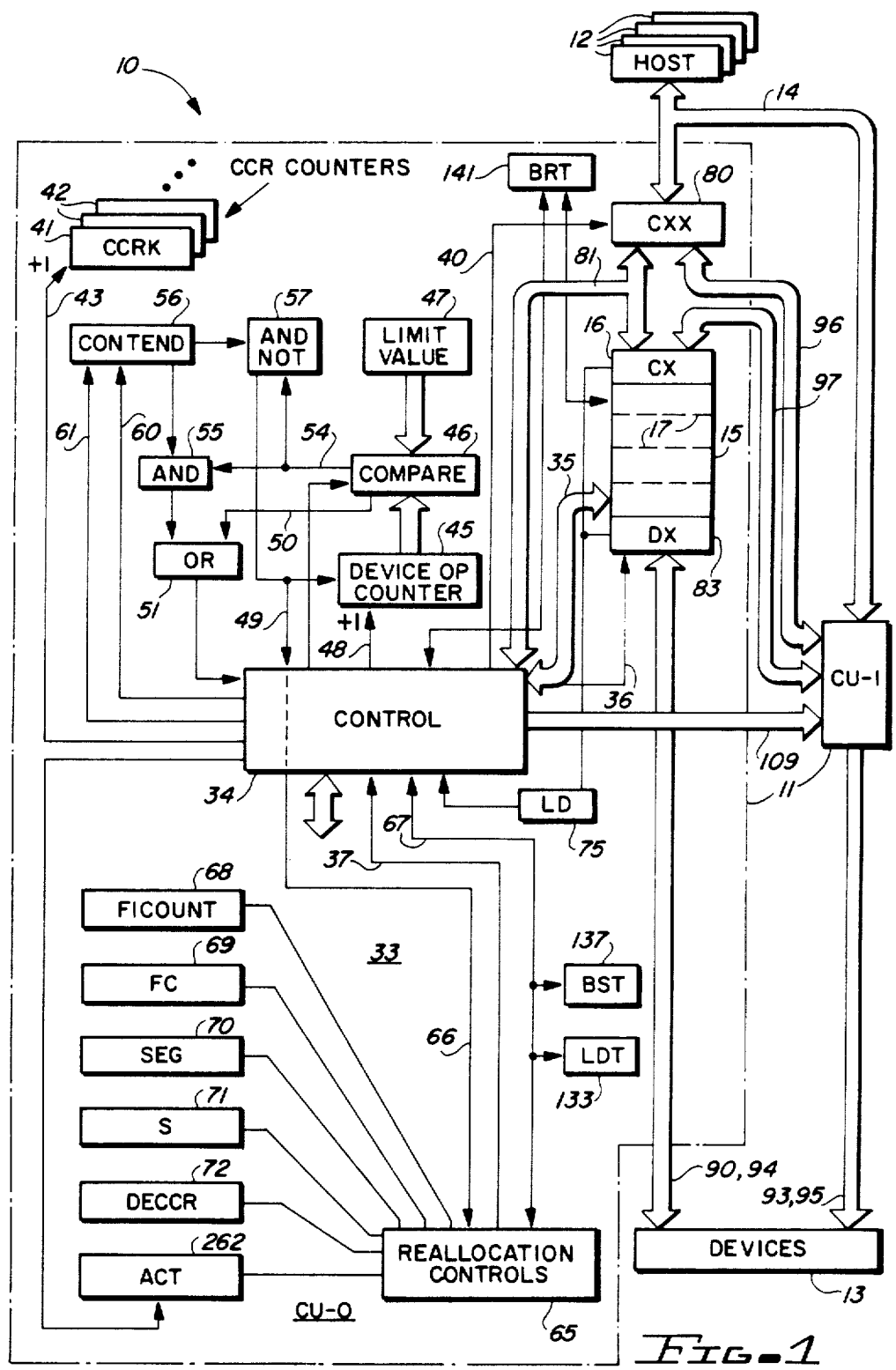
FIG. 1 is a simplified block diagram of a data processing system employing the present invention.

Referring now more particularly to the drawing, like numerals indicate like parts and structural features in the various diagrams. The invention is illustrated as being incorporated into storage system 10 having a pair of control units 11, also denominated as CU-0 and CU-1. Storage system 10 is connectable to a plurality of hosts 12 for receiving, storing and supplying data signals from and to the respective hosts under control of host operations, as is practiced in the data processing art. Storage system 10 stores data signals on behalf of the host in a plurality of data storage devices 13, such data storage devices 13 include, without limitation, magnetic tape or optically sensed tape recorders, magnetic or optical disk recorders, magnetic or optical card recorders and unit record equipment. Communications between hosts 12 and storage system 10 are via a plurality of input/output channels 14, constructed generally in accordance with the input/output channels set forth in Amdahl, et al., U.S. Pat. No. 3,400,371. For enhancing system 10 operations, each control unit 11 includes a data buffer 15, preferably constructed of semiconductive randomaccess memory elements. Buffers 15 are the prime conduits for data transfer between hosts 12 and devices 13; the arrangement is such that a host 12 can communicate with a given device 13 through either buffer 15 and via either control unit 11. Communications from input/output channels 14 to a buffer 15 are via channel adapter CXX 80 and bus 81 in CU-0 and via bus 96 to CU-1. It is understood that CU-1 is constructed identically to CU-0 with complementary connections (not shown) in CU-1. For example, bus 97 connects a channel adapter (not shown) of CU-1 to buffer 15 of CU-0 via channel data transfer circuits 16. Circuits 16 are known automatic data transfer circuits commonly used in the data processing art.

Since a plurality of devices 13 communicate through a single buffer 15 to a plurality of hosts 12, buffer 15 is dynamically managed as a plurality of allocatable data storage segments indicated by dashed lines 17. That is, when a given device 13 is communicating with a host 12, the given device 13 is assigned or allocated a data storage segment of buffer 15 for handling the data transfers. Devices 13 that are not currently transferring data need not be assigned such data storage segments; this freedom allows buffer 15 to be relatively small, such as 256,000 bytes of data storage. Buffer 15 allocations to devices 13 are normally maintained between successive data transfers in each independent series of data transfers or chains of commands.

Communications between buffer 15 and devices 13 are conducted through an automatic data transfer circuit DX 83. Connections from DX 83 to devices 13 are via a pair of cables 90 and 94, as detailed in U.S. Pat. Nos. 4,403,286 and 4,423,480 (hereafter patents '286 and '480). In a similar manner, CU-1 is connected to the devices 13 by another pair of cables 93, 95.

The control of storage system 10 resides jointly in the two control units 11. The showing in FIG. 1 is simplified in that those control circuits not pertinent to an understanding of the present invention are not detailed. Each control unit 11 includes a control 33, preferably including a programmed digital computer or microprocessor as shown in patents '286 and '480. Miscellaneous controls are indicated by numeral 34. Since the control of storage system 10 is shared between CU-0 and CU-1, interconnecting bus 109 provides communications between the two control units 11 for exchanging control data necessary to the logical control of storage system 10. Miscellaneous control 34 also controls automatic data transfer circuits CX 16 and DX 83 and the operations of buffer 15. Connections 81, 35 and 36 represent these controls.

A first portion of the invention relates to separate measurements of data transfer activity in CU-0 and CU-1 to ensure that the work is efficiently performed by the two control units on a dynamic basis. Since the buffers 15 of CU-0 and CU-1 are the prime conduits for data transfers between hosts 12 and devices 13, the status of the two buffers 15 at the time of a request for data is an indication of the current ability of the respective control units 11 for efficiently satisfying hosts 12 requests. For example, whenever a host 12 requests data from storage system 10 and that data is not in the buffer 15, then that event is used as an indication of control unit work load and, hence, data transfer efficiency. In a similar manner, if a host 12 desires to record data on a device 13 and the buffer 15 data storage segment allocated to the device is full of data, that status is another indication of control unit 11 work load. Also, when a buffer 15 segment is not allocated to a device 13 when a host 12 requests the use of that device 13 which requires buffer operation is an indication of control unit work load. Such indications are determined by control 34 while responding to a host 12 supplied input/output channel commands determining that the command cannot be immediately performed. Control 34 then indicates the delay by supplying a channel command retry (CCR) signal over line 40 through CXX 80 to the requesting host 12. Such channel command retries are fully explained in R. L. Cormier, et al., U.S. Pat. No. 3,688,274. According to this invention, each control unit 11 includes circuitry and controls for utilizing the CCR signals to maintain efficiency in each of the control units 11. The tally of CCR signals indicates intensity of operations for each of the devices 13 during each normalized elapsed time period.

For each allocated segment of a buffer 15, a separate tally "CCRK" is provided for the number of CCRs. The tallies, CCRK, are held in counter registers 41, 42. The CCR signal on line 40 also goes to respective counter registers 41, 42 for increasing the respective CCRK counts. Each CCR signal is associated with an addressed device 13 (the device to which the segment represented by registers 41, 42 is allocated); registers 41, 42 are addressed accordingly. In this manner, the activity intensity state for each of the allocated buffer segments is maintained in the separate CCR tallies. These separate tallies also indicate the relative responsiveness of the respective devices 13 and associated buffer 15 segments to hosts 12 requested operations.

All activities of the storage system 10 are based upon device 13 addresses. The combination of an allocated buffer 15 segment with a recorder or device 13 is termed a logical device, i.e., to hosts 12 the device 13 and allocated segment appear as a single unit. Each host 12 in its communications with storage system 10 always addresses a device 13; accordingly, the buffer 15 segments are not explicitly addressed by hosts 12 but are implicitly addressed by a device 13 address. Control 34 responds to the received input/output commands issued by hosts 12 as set forth in the incorporated documents. When a CCR is supplied to a host 12, as set forth above, control 34 supplies an address signal over bus 43 to select one of the registers 41, 42 representing the logical device being addressed and increments the count CCRK in the addressed counter register. To implement the invention in a preferred mode for measuring normalized elapsed time, each control unit 11 maintains a total device operations count in device op counter 45. Each time a device 13 is accessed by a control unit 11, the device op counter 45 contents are incremented by unity. To check for expiration of a normalized elapsed time, each time device op counter 45 is incremented, the numerical contents therein after incrementing are compared by compare circuit 46 with a threshold or limit value stored in register 47. When the counter 45 contents equal or exceed the register 47 threshold, then data buffer 15 data transfer activity should be investigated.

The normalized elapsed time is generated by control 34 incrementing drive operations (op) counter 45 by unity by supplying a signal over line 48 (in the programmed embodiment, the equivalent program function is performed) each time an operation is started with a device 13. There is one device op counter 45 in each control unit 11. Register 47 stores the numerical limit value indicating the expiration of a normalized elapsed time. Compare circuit 46 compares the count value of drive op counter 45 with limit value in register 47. Each time control 34 selects or activates a device 13 control 34 supplies a signal over line 49 for activating compare circuit 46. When compare circuit 46 detects that the numerical contents of drive op counter 45 are less than the limit value in register 47, a signal travels over line 50 through OR circuit 51 to control 34 signifying that the normalized time period has not yet elapsed. When compare circuit 46 finds that the numerical contents of drive op counter 45 are equal to, or greater than, the limit value of contents of register 47, an activity checking signal travels over line 54 for sampling AND circuit 55, as well AND/NOT circuit 57. When there is a contention for the data storage segment of data buffer 15 to be used with the current data transfer, i.e., associated with the addressed device 13, then no activity checking is to ensue. Contend latch 56 is set, as later described, any time there is a contention for any of the buffer 15 data storage segments. AND circuit 55 responds to the contend latch 56 being set for passing a continue and no checking signal through OR circuit 51 to control 34. On the other hand, when contend latch 56 is not set (no buffer 15 contention), AND/NOT circuit 57 responds to the line 54 signal to reset the drive op counter 45 for starting a new normalized time period. The AND/NOT circuit 57 output signal also goes to control 34 for initiating activity checking as later described and as illustrated in FIG. 1 by reallocation control 65. Line 66 carries the AND/NOT circuit 57 output signal for actuating reallocation control 65.

Upon each activation, reallocation control 65 examines a buffer record table BRT (shown in the documents incorporated by reference), the buffer status table (BST) 137, and the logical device table (LDT) 133 for measuring the activity intensity for each of the logical devices during the just-expired, normalized elapsed time period.

Reallocation control 65 employs a plurality of registers for storing counts for creating an indication of the maximum intensity of the devices 13, and hence the data storage segments of data buffer 15. It also determines whether any of the devices 13 had activity at all and the data storage status in data buffer 15. FICOUNT 68 is set to unity whenever a data storage segment of buffer 15 is free or inactive during an activity check. Register FC 69 stores the maximum fault count (herein CCR count CCRK) for all of the data storage segments of data buffer 15. This maximum count is used for identifying which of the data storage segments had the most CCRs (greatest intensity of activity) during the just-preceding normalized time period. Register SEG 70 stores the identification of the data storage segment of data buffer 15 which experienced the maximum count indicated in FC 69. Register S 71 identifies the data storage segment of the data buffer 15 currently being examined by reallocation control 65. Register DECCR 72 indicates whether a deallocate procedure should be invoked when the next channel command retry CCR is sent to a host 12. During the read mode, this bit indicates deallocation and purging data from data buffer 15 (as taught in U.S. Pat. No. 4,403,286) for enabling pairing buffer segments. Register ACT 262 contains a bit for each of the data storage segments of data buffer 15. The respective bits in ACT 262 are set by control 34 during the normalized time period whenever the respective data storage segments of data buffer 15 are accessed for any purpose at all. These bits indicate whether any activity has occurred at all for the respective data storage segments during the normalized time period. In the preferred embodiment, register ACT 262 is a portion of BST 137.

Turning now to FIG. 2, the determination by control 34 whether a data buffer 15 activity check should occur is described. This figure corresponds to the flow of control by a microprocessor in control 34 in performing the functions represented by items 45 through 57 of FIG. 1. The activity begins whenever a device 13 is selected such as a result of executing microprogram module termed "DM SDO" (this term is also used in the documents incorporated by reference). Numeral 543 represents the device 13 selection processes not pertinent to an understanding of the present invention. Such functions can be readily ascertained from reading the documents incorporated by reference. Assuming a device 13 is to be actuated for an ensuing data transfer operations, then control 34 (a microprocessor in control 34 controls the functions as set forth in the documents incorporated by reference) at step 115 starts the device 13 operation. This step can follow known procedures for starting operations of peripheral devices. As soon as a device 13 has received a "start" signal from control 34, then control 34 at step 116 increments the drive op counter 45 by unity. In step 117 control 34 actuates compare circuit 46 to compare the numerical contents of drive op counter 45 with the numerical contents of register 47. If the count is not equal to, or greater than, the threshold represented by the numerical contents of register 47, then control 34 returns to other machine operations as indicated by numeral 503. Numeral 502 indicates that return to other operations may be effected by control 34 from other machine operations, not pertinent to an unerstanding of the present invention. In the event in step 117 the numerical contents of drive op counter 45 are greater than, or equal to, the numerical contents of register 47, then in step 118 control 34 examines buffer contend latch 56. If there was contention for any of data buffers 15 storage segments, as later described, then the activity checking will not occur because reallocation is inapt at this time. In other words, when there is a pending request for additional data storage space in buffer 15, dynamic reallocation should not go forward until that contention has been removed. In this regard, two alternatives can be used in practicing the present invention. The drive op counter 45 may not be reset to zero whenever there is buffer contetion. Accordingly, each time a device 13 is to be selected for an ensuing data transfer operation, the compare circuits 46 are activated as indicated at step 117. This occurs until the contention for data buffer 15 space is removed such that dynamic reallocation can be performed without interfering with the current buffer 15 data storage space contention. In an alternate embodiment, the activity checking for possible reallocation can be deferred until the end of the next ensuing normalized time period. In the preferred mode, the first described mode, the normalized elapsed time period is extended a small amount by any data buffer 15 contention.

Returning to FIG. 2, if at step 118 buffer contention is detected, then other machine operations (not shown) are performed, as indicated at 503, b control 34. If there is no buffer contention at step 118, then control 34 in step 119 resets device op counter 45 to zero for starting a new normalized time period. Then control 34 proceeds to check the activity of data buffer 15 during the just-terminated, normalized time period and perform a dynamic buffer segment reallocation, as required.

The data structures for implementing the invention are described next. The logical devices are identified and controlled via LDT 133 (FIG. 4) while the data buffer 15 segments of the respective logical devices are controlled via BST 137 (FIG. 3). There is one entry register in BST 137 for each of the buffer 15 segments in the respective control units 11. Since all host processor 12 issued commands received by storage system 10 are based upon device 13 addresses and not upon buffer 15 segment addresses, LDT 133 provides an indirect address base for BST 137. In this regard, BSTP 253 in each of the registers of LDT 133 indicates the address of the corresponding entry in BST 137. Counter registers CCRK 41, 42 are in LDT 133. IRAH 225 is a bit indicating inhibit read ahead; that is, the storage system 10 will not transfer data from a device 13 to data buffer 15 without a command received by a host 12. DECCR 254 (same as DECCR 72) is a bit signifying to control unit 11 that when a CCR is sent for the addressed device 13 represented by the register in LDT 133, the corresponding data storage segment of data buffer 15 is to be deallocated. This bit is useful when dynamic reallocation involves a data storage segment storing data read from a device 13. Other LDT 133 fields, not pertinent to the present invention, relating to logical devices consisting of a device 13 and an allocated buffer 15 segment are indicated by ellipsis 256. BST 137 (FIG. 3) relating to buffer 15 segment operations has a plurality of fields in each of its registers for the respective buffer 15 segments. DADDR 260 stores the address of a device 13 to which the data storage segment is allocated. This allocation is indicated by A bit 263 being set to unity. If the data storage segment is not allocated, then A bit 263 is zero. The contents of DADDR 260 are then ignored. Field LRU 261 relates to the LRU linked list used for managing data buffer 15. When the represented data storage segment is allocated with another data storage segment to one device 13, the corresponding LRU 261 entries are nulled; the other data storage segment LRU 251 entry represents both of the data storage segments for allocation and replacement control purposes. ACT bit 262 indicates that the represented data storage segment was accessed during the current normalized time period as indicated by selection of its corresponding device 13. E field 264 indicates that the buffer 15 segment currently is engaged; that is, a data processing operation is currently being performed involving the buffer 15 segment represented by the BST 137 entry. F field 265 indicates that the segment has been scheduled for freeing, i.e., deallocation. RANGE 268 indicates relative size of data records in blocks currently being transferred, i.e., small, medium, large or extra large. D (direction) field 267 indicates forward or backward magnetic tape operations. P bit 270, when set, indicates that the segment is paired with another segment. Ellipsis 269 indicates that, in a constructed embodiment, other fields not necessary for describing the present invention may be included in a typical BST 137. By convention, only even numbered data storage segments (0,2,4,...) of a pair of data storage segments will be on the LRU linked list while the odd numbered data storage segments (1,3,5...), when paired, are omitted from the LRU linked list.

Setting contend bit 56 is achieved during allocation processing, as shown in FIG. 5. Any requests for a data transfer received from a host processor 12 wherein no current allocation exists (such as can be indicated in LDT 133 by its BSTP 253 equalling zero) causes the machine operations illustrated in FIG. 5 to be performed. Activation of control 34 to perform the FIG. 5 illustrated machine operations occurs at 274. Firstly, control 34 examines a pending allocation table (PAT 134) which identifies the addresses of all devices 13 requiring allocation of a data storage segment of data buffer 15. Pointers within PAT 134 indicate the beginning and end of the list of devices 13 using known table construction techniques. Each entry of PAT 134 includes paired bit P 135 for indicating whether one or two data storage segments are to be allocated. When P=0, one data storage segment is allocated, when P=1 two data storage segments are allocated. The beginning of the allocation list device 13 addresses is indicated by the character "I" and the bottom of the list is indicated by the character "O".

At step 280, control 34 determines whether the pending allocation table (PAT) 134 is empty; if table pointers in control 34 (not shown) to the first entry and table pointers (not shown) to the last entry in PAT 134 are equal, then PAT 134 is empty. With PAT 134 empty, control 34 proceeds at 288 to other machine operations. On the other hand, if PAT 134 is not empty (an allocation of a data storage segment is pending), then at 281 control 34 checks the data contents of BSTP field 253 in LDT 133 for the addressed device 13. If that BSTP 253 is not zero, the logical device address has both a pending allocation and deallocation. Control 34 then proceeds to other machine operations via return point 288. If the examined BSTP 253 of LDT 133 is zero, then allocation of a data buffer 15 segment is appropriate. At 282 control 34 examines the P bit 135 for the pending allocation request. If P=0, then a single segment of data buffer 15 is to be allocated to the addressed device 13 for constituting a logical device. For a single segment to be allocated, control 34 at 283 activates logic module BM ASE (not shown) which allocates a free one of the data buffer 15 data storage segments using known allocation methods. A "free list" of free data storage segments is kept in the usual manner. Upon completion of an attempt to allocate a single segment in step 283, control 34 at step 284 checks the return code (RC) from logic module BM ASE. When RC=0, a data buffer 15 segment was successfully allocated to the addressed device 13. Then, in step 285, the output pointer O of PAT 134 is incremented by unity. At step 286, following step 285, control 34 alters the BST 137 corresponding entry to the just-allocated buffer segment by setting its bit A 263 and E bit 264 to unity for indicating that the indicated segment is allocated and engaged and resets P bit 270 to indicate allocation of a single data storage segment. Control 34 also sets DADDR 260 to the address of the addressed device 13. Control 34 then returns to the activating logic module (not shown) at 288 for performing other machine operations.

Returning to step 284, when the return code (RC) is not equal to zero, control 34 knows that the attempted allocation was unsuccessful. This means that there is contention for data storage segments of data buffer 15. Accordingly, at step 287 contend bit or latch 56 (FIG. 1) is set to unity. Then, control 34 proceeds to other machine activities via point 288.

When control 34 at step 282 finds the paired bit P 135 equals unity, then two data storage segments are allocated to the addressed device 13. This paired allocation can be initiated by several means, one of which is in accordance with the present invention during dynamic reallocation. The identification of the pairing bit will become apparent from FIGS. 6 and 7. When a pair of data storage segments are to be allocated, control 34 at 289 activates a logic module BM APR (not shown) which using known techniques allocate two of the data storage segments to the address device 13. In the constructed embodiment, an even numbered data storage segment is the lower numbered segment in each pair of data storage segments. As indicated with respect to BST 137 of FIG. 3, when more than one data storage segment is allocated to a given device 13, only the even numbered data storage segment has an entry in LRU linked list 261. By convention, in the preferred embodiment, the segments of data buffer 15 are enumerated zero through N. The even numbered segments are always on the LRU list 261, while the odd numbered segments are on the LRU list only when they are singly allocated to an addressed device 13. Grouping of allocation segments with one of the allocation segments only being on an LRU replacement control list, such as list 261, is known and not described for that reason. Upon completion of attempting to allocate a buffer pair in step 289, control 34 proceeds to step 284 as previously described. With respect to step 286, BST 137 is amended in accordance with the paired allocation by setting both the A bit 263 and E bit 264 of both data storage segments to unity and the P bits 270 to unity for both data storage segments.

Figure 6:
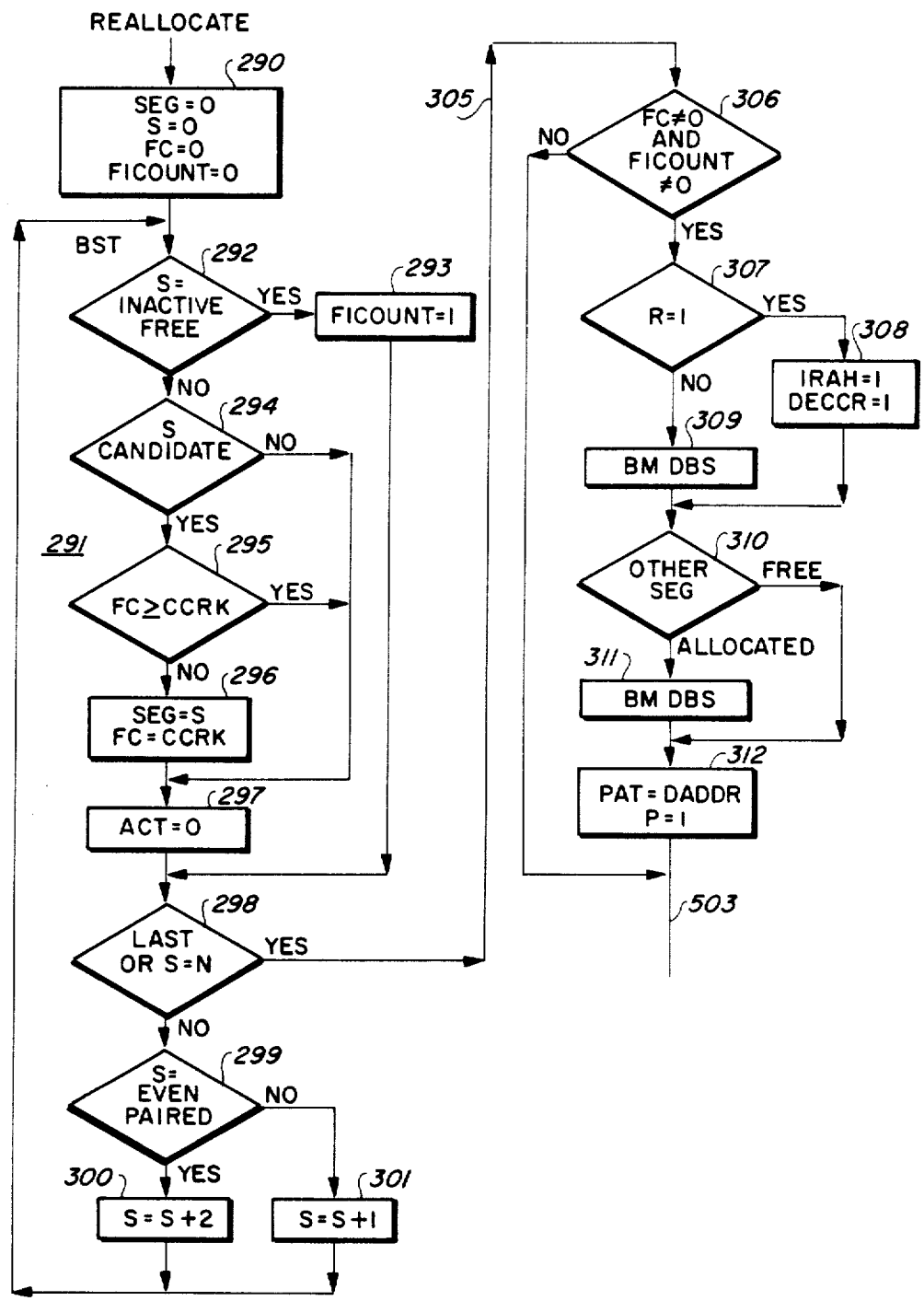
FIGS. 6 and 7 are flowcharts illustrating the operation of the FIG. 1 illustrated system during activity checking and dynamic reallocation.

FIG. 6 illustrates the machine operations of controls 65, which are preferably microprocessor executed and controlled, for examining the activity of data buffer 15 as to intensity of activity for (devices 13) a just-terminated, normalized elapsed time period. Controls 65 at step 290 initializes its registers of FIG. 1 for performing the logical device activity examination. Initialization consists of setting registers S 71, FC 69, SEG 70 and FICOUNT 68 to zero (or other null value). Examination of the activity of all data storage segments of data buffer 15 is achieved within iterative loop 291 which serially examines the CCR-indicated activities of each of the data storage segments beginning with the segment designated by numeral zero and proceeding arithmetically to segment number N. Because of pairing, the number of loop iterations can vary from N/2 through N. At step 292, controls 65 access BST 137 to determine whether the data storage segment identified in register S 71 is inactive or free. If bit F 265 equals unity, then that examined data storage segment designated by the contents of register S 71 is free. If ACT 262 is zero, the segment has been inactive for the entire normalized elapsed time period. For a free or inactive segment, controls 65 at step 293 set FICOUNT bit 68 to unity for indicating that at the end of the normalized elapsed time period, at least one of the data storage segments of data buffer 15 was free or inactive. From step 293, control 34 proceeds to index the loop as will be described.

When controls 65 find that the data storage segment being examined is not free or not inactive, then at step 294 controls 65 determine whether the data storage segment being examined is a candidate for reallocation. First, controls 65 examines RANGE 268 of BST 137 (FIG. 3) to determine the size of data being transferred through the data storage segment being examined. RANGE 268 stores a general indication of the size of data records or blocks being transferred. Length detector 75 (FIG. 1) counts the number of data bytes in each block or record being transferred either through CX 16 or DX 83. Four ranges are set up: small, medium, large and extra large.

To obtain the range, control 34 at the end of transferring a record or block of data receives the byte count from length detector 75. Control 34 then compares the received byte count with three thresholds (one threshold between two of the four ranges), and indicates the range. The RANGE 268 of BST 137 is updated. This action may occur once in each series of block or record transfers or once in a single chain of I/O commands.

By arbitrary definition, only the large and extra large block-sized transfers are eligible for reallocation in a first-constructed embodiment of the invention. The reason for this determination is that when medium size data blocks are being transferred, the possibility of needing more than one data storage segment of data buffer 15 for accommodating the data transfers is highly remote; there is no need to pair the current data storage segment being used with any other data storage segment. Therefore, for small sized data blocks, the segment indicated in S 71 is not a candidate for reallocation. Also, certain error conditions may make the respective data storage segments unavailable for dynamic reallocation.

Assuming that the examined data storage segment is a candidate for dynamic reallocation, then controls 65 in step 295 compare the numerical contents of FC 69 with the numerical contents of the CCRK register 41, 42 for the identified data storage segment. When the current fault count in FC 69 is greater than, or equal to, the fault count in the respective CCRK register, then the numerical contents of FC 69 are not altered. On the other hand, when the numerical count contents of FC 69 are less than the respective CCRK register contents, then at step 296 the count contents of the respective CCRK register are transferred to FC 69 for storing the largest fault count found in the intensity examinations to the present data storage segment being examined. Also, the contents of SEG 70 are set equal to the identification of the data storage segment associated with the CCRK count just-loaded into FC 69.

Controls 65 from either step 295 or 296 then access ACT 262 in the respective register of BST 137 for resetting that bit to zero. This primes BST 137 for the ensuing normalized elapsed time period as indicating no activity has occurred for the respective data storage segment.

Controls 65 from either step 293 or 297 then index the loop 291. In step 298 control 34 compares the contents of S 71 with the number N of data storage segments existing in data buffer 15. If the just-examined data storage segment is the Nth data storage segment, this means the last data storage segment has been examined. Accordingly, control 34 exits the loop as indicated by following line 305. When the just-examined data storage segment is not the last data storage segment, then in step 299 controls 65 examine the contents of register S 71 for odd-even value. If the examined S value is odd, then controls 65 in step 301 increment S by unity. If the examined S value is even, then P bit 270 in the corresponding entry of BST 137 is examined to determine whether the even numbered data storage segment is paired with an odd numbered segment. If it is not paired, then the odd numbered segment has to be examined; the value S is incremented by unity in step 301. If P bit 270 is unity, then the odd numbered segment is not to be examined. Controls 65 then increment S by two in step 300 for omitting the examination of the next high odd numbered segment. Following step 300 or 301, steps 292 through 297 are repeated until all necessary segments have been examined for intensity of activity as indicated by the respective CCRK counts.

Upon completion of examination loop 291, controls 65 then determine whether dynamic reallocation should be initiated. Firstly, from line 305 at step 306, controls 65 examine the numerical content of registers FC 69 and FICOUNT 68. If the data contents of both registers are nonzero, then at least one CCR has been sent to a host 12 during the immediately preceding normalized elapsed time period, and at least one data storage segment is either free or inactive for permitting a possible dynamic reallocation. If either of the registers FC 69 or FICOUNT 68 are zero, then a dynamic reallocation should not be performed. Controls 65 then indicate to control 34 over line 67 (FIG. 1) to return from step 306 via point 503 (FIG. 6) to other machine activities not pertinent to the present invention.

When dynamic reallocation is possible, then controls 65 in step 307 examine R bit 266 of BST 137 for the data storage segment identified in SEG register 70 to determine whether that data storage segment is in the read or write mode. When R bit 266 is unity, the read mode is indicated; this causes controls 65 in step 308 to inhibit read ahead by setting IRAH bit 225 and DECCR bit 254 of LDT 133 for the logical device having the SEG 70 identified storage segment to unity. The operative effect on storage system 10 is to inhibit further reading of data into the SEG 70 identified data storage segment and primes the control unit 11 to look for a deallocation when the next CCR is sent to host 12 for the related logical device. The practical effect is that the host 12, which has a read operation pending with the device 13 associated with the SEG 70 identified data storage segment will read data from that data storage segment of buffer 15 until a channel command retry (CCR) is required, as described with respect to FIG. 7; then, that segment will be deallocated for permitting a later paired allocation of data storage segments to the corresponding device 13, as fully explained with respect to FIG. 7. When the mode of operation for the SEG 70 identified data storage segments is not the read mode, then controls 65 at step 309 proceed with deallocation by activating a logic module (not shown) termed "BM DBS" which causes controls 65 to deallocate the SEG 70 identified data storage segment. Deallocation follows normal and known procedures; such deallocation can include writing data from the SEG 70 identified data storage segment to the corresponding device 13.

Then controls 65 in step 310 examine the other data storage segment in the segment pair that corresponds to the data storage segment just deallocated in step 309. When the just-deallocated segment is an odd numbered segment, then the next lower numbered even segment is the other segment. When the just-deallocated segment is an even numbered segment, then the next higher odd numbered segment is the other segment. If such other segment is allocated, then it must be deallocated for permitting dynamic reallocation with the just-deallocated data storage segment. Accordingly, in step 311, controls 65 again activate logic module BM DBS for deallocating the identified other segment. Upon completion of step 311, or if the other segment was not allocated at step 310 (bit D 267 of BST 137 equalled zero), there are two data storage segments which are pairable and deallocated. These two data storage segments are now available for allocation as a pair for the device 13 which formerly had the SEG 70 identified data storage segment for completing its logical device. On the other hand, if in step 310 the identified other segment is free, then no deallocation is required. Then controls 65 in step 312 adds the SEG 70 identified device 13 address (DADDR) into PAT 134 of FIG. 5 and sets the corresponding P bit 135 to unity. This primes the allocation procedures of control 34 for allocating a pair of data storage segments of data buffer 15 to the SEG 70 identified device 13. The actual allocation occurs as described with respect to FIG. 7 and does not occur until a host 12 requires further data transfer activity with such identified device 13. Then controls 65 at 503 enables control 34 to perform other machine activities pending receipt of the next data transfer command from a host 12.

Figure 7:
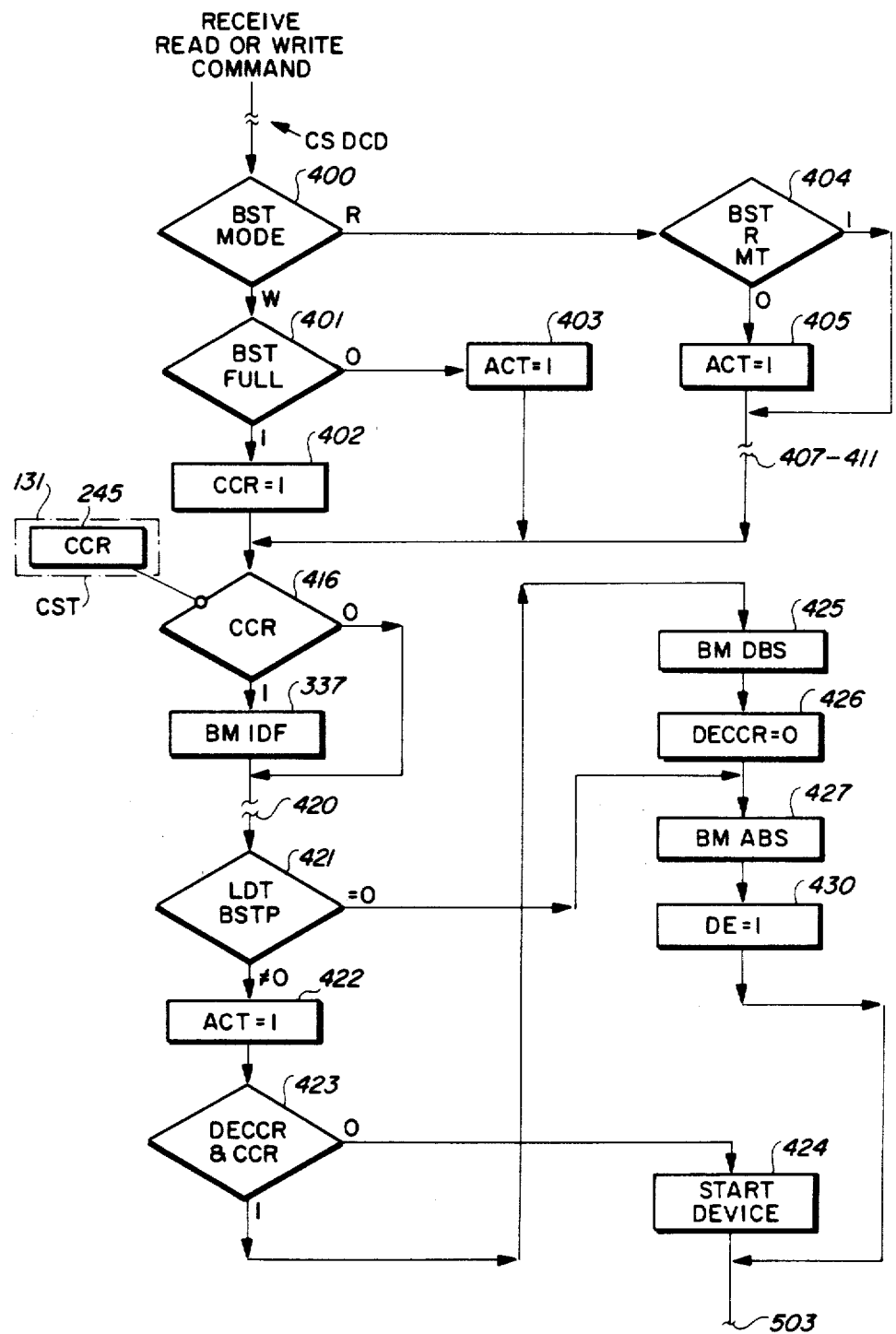

FIG. 7 illustrates how the dynamic reallocation is completed upon receipt of a host-issued command after the above-described deallocation operations. Certain functions are performed in decoding the received host-issued command as indicated by the legend CS DCD. At step 400 the mode of operation identified in BST 137 for the addressed device 13 is examined. If it is in the read mode, as indicated by R bit 266, then at 404 control 34 examines BST 137 to determine whether the corresponding data storage segment is empty (MT) by examining the corresponding buffer record table as referred to earlier. If the buffer record table shows data stored in the data storage segment of the addressed logical device (as by having an entry identify a data record) then at step 405 ACT bit 262 of the corresponding BST 137 register is set to unity. Then at 407–411 further machine operations with respect to command execution, not pertinent to an understanding of the present invention, are performed.

Returning to step 400, when the write mode is indicated in BST 137 by R bit 266 being equal to zero, control 34 in step 401 determines whether data is stored within the data storage segment corresponding to the addressed device 13. If the data storage segment is full, it cannot receive any additional data. Accordingly, a channel command retry is sent to the command-issuing host 12 at step 402. When the host 12 accepts the CCR, CCR bit 245 of command status table 131 is set to unity. See incorporated patent '286 for more detail. In some instances, channel adapter CXX 80 may have sent a CCR without involving control 34 (a normal known practice of IBM control units). In such a case, no additional CCR is sent at step 402. When CXX 80 sends a CCR, it notifies control 34 such that CCR bit 245 of command status table CST 131 is set. Control 34 before sending a CCR to CXX 80 examines the CST 131 CCR bit 245; if set, a CCR has been sent and no additional CCR will be sent in step 402.

If the examined data storage segment is not full, then at 403 ACT bit 262 of BST 137 is set to unity. Then at 416, control 34 determines whether a CCR has been sent, such as at step 402 and CCR bit 245 of CST 131. When a CCR is sent, the logic module BM IDF (not shown) is activated at step 337 for incrementing the respective CCRK count 41, 42 using known data processing counting techniques. At 420, additional functions of the command decoding are performed not pertinent to an understanding of the present invention. Then control 34 in step 421 examines BSTP 253 for the addressed device 13. If BSTP 253 is equal to zero, then no data storage segment of data buffer 15 is currently allocated to the addressed device. At 430, control 34 activates logic module BM ABS which performs the functions described with respect to FIG. 5. Upon completion of the allocation, which will include a paired allocation during dynamic reallocation, a DEVICE END (DE) is sent to host 12 using the channel command retry procedure described in U.S. Pat. No. 3,688,274, incorporated herein by reference. Then control 34 proceeds to other machine activities at 503 awaiting retransmission of the same command received as indicated at the beginning of the description of FIG. 7. Then the steps are repeated, however, the next iteration of the command execution finds the allocation completed through step 430 and the requested data transfer ensues.

Returning to step 421, when BSTP has a non-zero value in it, then ACT 262 corresponding to the addressed device 13 is set to unity for showing activity during a normalized elapsed time period. Then at 423, bit DECCR 254 of LDT 133 is examined. If it is zero, then no additional control activity is needed; the addressed device 13 is started in step 424. Then control 34 proceeds to other machine activity pending the device 13 bringing the magnetic tape (not shown) up to speed across its transducer. At step 423, when DECCR bit 254 is set to unity and a CCR was sent at step 402, or earlier, with respect to the data storage segment (the CCR was actualy sent with respect to the logical device to which the data storage segment is allocated); then the currently allocated data storage segment is deallocated at step 425 and at 426 DECCR bit 254 is reset to zero. Steps 430 and 427 are performed when either BSTP 253 for the addressed device 13 equals zero or null at step 421, or upon the completion of step 426. In step 427, control 34 allocates a pair of the data storage segments of buffer 15, such as the data storage segments which have been deallocated, to the addressed device 13. FIG. 5 illustrates the allocation procedure. The allocation of the segments completes the dynamic reallocation procedures enabling storage system 10 to proceed with the requested data transfer with a buffer allocation which now can handle ensuing data transfers for the addressed device 13 more efficiently. This fact is signalled to the requesting host 12 by storage system 10 sending a DEVICE END (DE) at step 430 via CXX 80. While the storage system 10 proceeds to other machine activity by control 34 exiting the illustrating procedures at 503, the requesting host 12 responds to the DE by retransmitting the data transfer requesting command to storage system 10.

While the invention has been particularly shown and described with reference to preferred embodiments thereof, it will be understood by those skilled in the art that various changes in form and details may be made therein without departing from the spirit and scope of the invention.

What is claimed is:

1. In a data storage system for handling a plurality of independent data transfers wherein each of said data transfers includes transferring blocks of data in a predetermined succession of such blocks of data; a data buffer having a plurality of allocatable data storage segments, each of said segments having a plurality of addressable data storage registers and for storing one or more of said blocks of data; transfer means coupled to the data buffer for effecting transfer of said blocks of data ino and out of said data buffer in said plurality of independent data transfers and adapted to be connected to data source-sinks for transferring such blocks of data with any connected data source-sinks, respectively, in said independent data transfers;

the improvement including, in combination:

buffer record table means connected to said data buffer and to said transfer means for storing indications of data stored in the buffer and the available data storage registers for each of said data storage segments;

system means for indicating a predetermined elapsed time;

block length means connected to said data buffer and to said transfer means for separately indicating for each of said data storage segments a length of the data blocks currently being stored in the respective data storage segments;

checking means connected to said block length means, said system means and to said buffer record table means for responding to said system means indicating a predetermined elapsed time for accessing the stored indications of said buffer record table means and the length indications of said block length means for identifying ones of said data storage segments respectively allocated to said independent data transfers, which have stored given blocks of data exceeding a predetermined block length and which relates to a one of said independent data transfers for allocating an additional data storage segment to a one of said one's independent data transfer; and allocation control means connected to said checking means, to said buffer record table means and to said data buffer and being responsive to said checking means indicating said given blocks to allocate an additional one of data storage segments to a predetermined one of said independent data transfer.

2. The data storage system set forth in claim 1 further including, in combination:

intensity means connected to said transfer means and to said buffer means to sense said intensity of activity individually of said data storage segments and recording said sensed indications of intensity of activity for each of said data storage segments; and said checking means having reallocate screening means connected to said intensity means for comparing the recorded intensities of said data storage segments and indicating which one of said data storage segments has the greatest recorded intensity and selection means in the checking means responsive to said greatest intensity indication to select a one of said identified data storage segments and to identify said one independent data transfer as being the independent data transfer holding allocation of said selected data storage segment.

3. The data storage system set forth in claim 2 further including, in combination:

reset means in said checking means connected to said system means and to said intensity means for responding to said indication of expiration of said predetermined elapsed time to initiate measurement of another predetermined elapsed time and to reset said intensity means to restart said intensity measurements.

4. The data storage system set forth in claim 3 further including, in combination:

buffer status table means connected to said buffer for storing indications of the status of each of said data storage segments wherein status shows allocation to respective ones of said independent data transfers, availability for allocation and whether allocated with another one of said data storage segments to a one of said independent data transfers, hereafter called paired dication, and connected to said allocation control means for receiving allocation changes and storing same as status and indicating said stored status;

availability means in said checking means connected to said buffer status table means, to said screening means and to said reset means for responding to said buffer record table means indicating that none of said data storage segments are available for allocation and to inhibit said reset means and said allocation means from allocating any of said data storage segments while said none indication is active; and deallocation means connected to said buffer and to said availability means for deallocating ones of said data storage segments from said independent data transfers and then activating said availability means to remove said none indication.

5. The data storage system set forth in claim 1 further including, in combination:

a plurality of addressable data storage devices connected to said transfer means for transferring data with allocated ones of said data storage segments as a part of respective ones of said independent data transfers; said addressable data storage devices being data source-sinks;

attachment means for connecting said data storage system to a host processor and connected to said transfer means for transferring data between said data buffer and a connected host processor;

said system means being connected to said transfer means and having counting means for counting the number of accesses to any of said data storage devices; and limit value means in said system means for storing a limit value indicating expiration of a time period as a normalized time period, compare means in said system means and connected to said counting means and said limit value means for comparing said counted number of accesses with said limit value and when said counted number of accesses equals or exceeds said limit value supplying said elapsed time indication.

6. In the data storage system set forth in claim 5, further including, in combination:

activity measuring means connected to said transfer means for recording an intensity of activity for each of said data storage segments; and said checking means being connected to said activity measuring means for responding to a maximal one of said recorded intensities of activity to select a one of said independent data transfers related to said identified data storage segments as said predetermined one of said independent data transfers.

7. In the data storage system set forth in claim 6, further including, in combination:

activity indicating means connected to said transfer means for recording whether or not any activity has occurred with respect to respective ones of said data storage segments; and deallocation means connected to said activity indicating means and to said checking means for indicating ones of said data storage segments not having any activity recorded by said activity indicating means as eligible for allocation to said predetermined one of said independent data transfers.

8. In the data storage system set forth in claim 1, further including, in combination:

contend means connected to said allocation control means and to said data buffer for sensing attempted allocations of said data storage segments that fail and for indicating a one of said sensed failed allocations as a contention indication;

inhibit means in said checking means and connected to said contend means for being responsive to said contention indication to inhibit said checking means from responding to said system means so long as said contention indication is indicating a failed allocation; and means connected to said contend means for resetting said contention indication for permitting said checking means to respond to said system means.

9. In the data storage system set forth in claim 8, further including, in combination:

reset means in said checking means and being connected to said system means for resetting said elapsed time indication each time said checking means responds to said system means.

10. In a data storage system for handling a plurality of independet data transfers wherein each of said data transfers includes transferring blocks of data in a predetermined succession of such blocks of data; a data buffer having a plurality of allocatable data storage segments, each of said segments having a plurality of registers for storing one or more of said blocks of data; transfer means coupled to the data buffer for effecting transfer of said blocks of data into and out of said data buffer in said plurality of independent data transfers in a plurality of successions of transfers of blocks of data and adapted to be connected to data source-sinks for transferring such blocks of data with any connected data source-sinks;

the improvement including, in combination:

buffer record table means connected to said data buffer and to said transfer means for storing indications of data stored and the available data storage registers for each of said data storage segments;

system means coupled to said transfer means for counting the number of successions of blocks of data being transferred with a first one of said source-sink means and said data buffer by all of said independent data transfers;

value means storing and indicating a predetermined count;

compare means connected to said system means and to said value means for determining and indicating when said count equals or exceeds said predetermined count;

CCR generating means connected to said buffer record table means and to said transfer means for indicating a system check point when an ensuing transfer of a block of data with a one of said data storage segments cannot be successfully completed;

CCR counting means connected to said CCR generating means for separately counting each said indicated unsuccessful ensuing transfer of a block of data;

checking means connected to said compare means, said CCR counting means and to said buffer record table means for responding to said compare means indicating said system check point for accessing the stored indications of said buffer record table means and said separate CCR counts for identifying a one of said data storage segments storing given blocks of data which relate to a one of said independent data transfers having allocation of a data storage segment with a largest one of said CCR counts for allocating an additional data storage segnt to said one independent data transfer;

allocation control means connected to said checking means, to said buffer record table means and to said data buffer to allocate an additional data storage segment to said one independent data transfer; and reset means coupled to said CCR counting means and to said checking means for resetting said CCR counts each time said checking means responds to said compare means.

11. In the data storage system set forth in claim 10, further including, in combination:

activity means connected to said data buffer for indicating accessing activity of respective ones of said data storage segments;

said reset means being connected to said activity means for resetting said activity indications;

deallocation means connected to said allocation means and to said activity means for responding to said allocation means allocation and to said activity means indicating the ones of said data storage segments not having any activity to deallocate a one of those data storage segments not having any activity for permitting said allocation means to allocated such deallocated data storage segment to said one independent data transfer.

12. In the data storage system set forth in claim 11, further including, in combination:

said one source-sink means being a plurality of addressable data storage devices;

said CCR counting means counting the CCR's for each of said plurality of addressable data storage devices as being the CCR counts for said independent data transfers, respectively; and availability means connected to said data buffer and to said checking means for determining and indicating to said checking means whether any of said data storage segments are available for reallocation or are not allocated and said checking means having inhibit means responsive to said indication for preventing any reallocation if none of the data storage segments are not allocated or not available for allocation.

13. In the data storage system set forth in claim 11, further including, in combination:

contend means connected to said allocation control means and to said data buffer for sensing attempted allocation that fails and for indicating said sensed failed allocation as a contention indication;

means in said checking means connected to said contend means for being responsive to said contention indication to inhibit said compare means from comparing; and deallocation means connected to said contend means and to said data buffer for deallocating data storage segments to make such deallocated data storage segments available for allocation and for resetting said contend means.

14. In a data storage system for conducting a plurality of independent data transfers wherein each of said data transfers includes transferring blocks of data in a predetermined succession of such blocks of data; a data buffer having a plurality of allocatable data storage segments, each of said segments having a plurality of registers for storing one or more of said blocks of data; transfers means coupled to the data buffer for effecting transfer of said blocks of data into and out of said data buffer in said plurality of independent data transfers and adapted to be connected to data source-sinks for transferring such blocks of data with any connected data source-sinks;

the improvement, including, in combination:

buffer record table means connected to said data buffer and to said transfer means for storing indications of data stored and available data storage registers for each of said data storage segments;

system means connected to said transfer means for measuring elapsed time of all data transfers in said transfer means and averaging the measured elapsed times for indicating a normalized predetermined elapsed time;

checking means connected to said system means and to said buffer record table means for responding to said system means indicating a normalized predetermined elapsed time for accessing the stored indications of said buffer record table means having identifying means for identifying a one of said data storage segments storing given blocks of data and which has predetermined available data storage registers and which relate to a one of said independent data transfers for allocating an additional data storage segment to said one independent data transfer; and allocation control means connected to said checking means, to said buffer record table means and to said data buffer to allocate an additional data storage segment for said one independent data transfer.

15. In the data storage system set forth in claim 14, further including, in combination:

said allocation control means including contention detection means connected to said data buffer for detecting and indicating contention for allocation of one of said data storage segments for more than one of said independent data transfers;

contend means connected to sad contention detection means in said allocation control means and to said checking means for sensing and storing as a contention indication any attempted allocation of any given data storage segment by said allocation control means that fails because said given data storage segment is allocated and for inhibiting said checking means so long as said contention indication is stored; and means connected to said contend means for resetting said contention indication whereby said checking means is no longer inhibited.

16. In the data storage system set forth in claim 14, further including, in combination:

intensity means connected to said transfer means for measuring and storing intensity indications representing the intensity of data storage activity for respective ones of said data storage elements;

said checking means including comparing means connected to said intensity means for receiving said intensity indications for identifying a one of said data storage elements having a maximum intensity of data storage activities and connected to said identifying means for causing said identifying means to identify said maximum intensity data storage segment as being used in the independent data transfer which is identified as said one independent data transfer.

17. In the data storage system set forth in claim 16, further including, in combination:

availability means connected to said data buffer for indicating which of said data storage segments are available for allocation by being unallocated or inactive; and said checking means being connected to said availability means for being responsive to said availability indication to respond to said system means.

18. In the data storage system set forth in claim 17, further including, in combination:

a plurality of data storage devices in said source-sink means addressably connected to said data buffer such that allocated ones of said data storage segments that are respectively allocated to said data storage devices are logical devices with said logical devices respectively conducting a different one of said independent data transfers;

CCR means connected tsaid data buffer and to said intensity means for counting the number of times any attempted data transfer is delayed because either data storage registers of a data storage segment being access are empty or full such that the attempted data transfer cannot immediately proceed and for supplying said count to said intensity means for memorization as said measured and stored activity intensity indications; and means for resetting said intensity means stored activity intensity indications for restarting said intensity measurements.

19. In a data storage system having a data buffer with allocatable data storage segments, each of said data storage segments having a plurality of addressable data storage registers for storing data, means in said data buffer for addressing said addressable registers and said data storage segments, data transfer means in said data buffer for transferring data into and out of said data buffer;

the improvement including, in combination:

a programmable digital processor connected to said addressing means, to said data transfer means and to said data buffer for operating same by addressing the data buffer via said addressing means and for supplying command signals to said data buffer for causing the data buffer to receive and supply data respectively for storage and retrieval from addressed ones of said data storage segments;

a control store connected to said programmable digital processor for storing program indicia to enable said digital processor to operate said data buffer including controlling transfer of data into and out of said data buffer;

data transfer program indicia in said control store for enabling said digital processor to allocate ones of said data storage segments to respective ones of a plurality of independent series of data transfers such that each of said series of data transfers result in storage and retrieval of data in and from only one of said data storage segments, each said series of data transfers including transferring blocks of data in time separated data transfers;

buffer record table indicia in said control store for receiving and storing data buffer status signals generated by the programmable digital processor as enabled by said data transfer program indicia and including identification of said stored blocks of data, the amount of data stored in each of said data storage segments;

counter program indicia in said control store for enabling said digital processor to count the number of times and store the count that a series of data transfers occurs in the data buffer independently of which of said data storage segments stores or retrieves stored data in each said series of data transfers;

delay count program indicia in said control store for enabling said digital processor to separately count for each of said data storage segments the number of times said data buffer cannot successfully permit a one of said series of data transfers to occur;

checking program indicia in said control store for enabling said digital processor to respond to said counter program indicia counting to a predetermined value to examine the delay counts as enabled by said delay count program indicia and to select a one of said data storage segments having the largest delay count which represents a one of said independent series of data transfers exhibiting data transfer activity resulting in a maximal data transfer delay;

allocation program indicia in said control store for enabling said digital processor to allocate an additional one of said data storage segments to said one independent series of data transfers; and reset program indicia in said control store for enabling said digital processor to reset all of said delay counts and said stored transfer counts each time said checking program indicia has enabled said digital processor to select a one of said data storage segments.

20. In the data storage system set forth in claim 19, further including, in combination:

said allocation program indicia further including program indicia for enabling said programmable digital processor for allocating ones of said data storage segments which are not additional ones of said data storage segments and for detecting and indicating as a contention any attempted allocation requiring a deallocation before the attempted allocation can be completed;

said checking program indicia further including program indicia for enabling said programmable digital processor for examining said contention indication and or responding to said contention indication to prevent reallocation until after said contention indication has been removed; and deallocation program indicia in said control store for enabling said programmable digital processor to deallocate said allocated ones of said data storage segments and having program indicia for enabling said programmable digital processor to remove said contention indication when any one of said allocated data storage segments has been deallocated.

21. In the data storage system set forth in claim 20, further including, in combination:
availability program indicia in said control store for enabling said programmable digital processor to indicate which of said data storage segments are available for allocation to said allocation program indicia and including activity program indicia for enabling said programmable digital processor to mark ones of said data storage segments as inactive and available for allocation whenever said counter program indicia enabled said programmable digital processor to count to said predetermined value if since the immediately previous time the count to said predetermined value no data transfer occurred with respect to such data storage segment.

22. In the data storage system set forth in claim 21, further including, in combination:
a plurality of data storage devices addressably connected to said data buffer for transferring data therewith under control of said programmable digital processor;
attachment means connected to said programmable digital processor and to said data buffer for connecting same to a host processor whereby host processor issued commands including functions to be performed by the data storage system including transferring data between said host processor and addressed ones of said data storage devices may be transferred to the programmable digital processor and data may be transferred between said connected host processor and said data buffer under control of said digital processor; and
command program indicia in said control store for enabling said programmable digital processor to receive said host processor issued commands and respond to said received commands for operating said data storage system to execute the commands.

23. In a machine-implemented method of operating a data buffer having a plurality of allocatable data storage segments;
including the steps of:
allocating predetermined ones of said data storage segments for respective independent data transfers;
transferring data by said independent data transfers in blocks of data;
measuring the length of blocks of data being transferred in said respective independent data transfers;
memorizing the amount of data stored and the free space available for data storage in each of said data storage segments as data storage status;
respectively counting the number of data transfer delays encountered with said independent data transfers as caused by data buffer segment status respectively for data stored in the data buffer and the free data storage space in the respective data storage segments when not meeting the data storage requirements of any given data transfer;
establishing a normalized time period related to the activity of said data buffer for all of said independent data transfers;
measuring elapsed time in a normalized manner;
comparing said measured time with said established time period, when said measured time is less than said established time continue transferring data but when said measured time exceeds or equals said established time, then comparing for each of said data storage segments the number of delays counted and for the data storage segment having the greatest number of said delays counted allocating an additional one of said data storage segment for the independent data transfer having allocation of said data storage segment with said greatest number of delays.

24. In the method set forth in claim 23, further including the steps of:
in said measuring elapsed time step, counting the number of accesses to said data storage segments as an indication of normalized elapsed time;
in said estalishing step, setting a count value as representing said normalized elapsed time period; and
in said comparing step, comparing said set count value with said access count as representing the comparison of said measured time with said established time period.

25. In the method set forth in claim 23, further including the steps of:
attempting to allocate a predetermined one of said data storage segments for a one of said independent data transfers and detecting that none of said data storage segments are available to be said predetermined one data storage segment and setting a contention indication signifying said contention for allocation;
deallocating a one of said allocated data storage segments and removing said contention indication;
delaying said comparing step until after said contention indication has been removed so that said deallocation step is completed before any reallocation steps are effected.

26. In the method set forth in claim 25, further including the steps of:
initiating a plurality of said transferring data steps and for each initiation performing said comparing step.

27. In a method for operation a data storage device having allocatable data storage segments, the steps of:
establishing a normalized elapsed time measurement period of time related to the total data storage activity of the data storage device such that the busier the data storage device the shorter the normalized elapsed measurement period;
during each normalized elapsed time measurement period metering the intensity of data transfer activity for each of said data storage segments and keeping a list of data storage segments not having any activity at all;
allocating ones of said data storage segments for respective ones of a plurality of data transfer operations; including deallocating some of the allocated data storage segments and reallocating such deallocated data storage segments for use with other ones of said data transfer operations, during said allocation and deallocation memorizing any contentions for allocated ones of said data storage segments;
upon expiration of each normalized elapsed time measurement period checking the metered data transfer activities and selecting the data storage segment having the most intense data transfer activity to have an additional one of said data storage segments for its data transfer operations so that said its data transfer operation employs one more of said data storage segments; and
whenever said contention indication is active at the expiration of said normalized elapsed time measurement period, extending said normalized elapsed time measurement period until said contention indication becomes inactive and then perform said checking and electing step.

* * * * *